United States Patent
Arman

[11] 3,930,279
[45] Jan. 6, 1976

[54] RUBBER WINDSHIELD WIPER BLADES HAVING INCREASED FLEXIBILITY AT CLAMPING POINTS

[76] Inventor: Dario Arman, via Venario, 13/15, 10040 Druento (Turin), Italy

[22] Filed: July 1, 1974

[21] Appl. No.: 484,521

[30] Foreign Application Priority Data
July 31, 1973 Italy.................................. 69308/73

[52] U.S. Cl............................ 15/250.36; 15/250.42
[51] Int. Cl.².......................................... B60S 1/38
[58] Field of Search................... 15/250.36, 250.42

[56] References Cited
UNITED STATES PATENTS

| | | | |
|---|---|---|---|
| 2,140,453 | 12/1958 | Horton............................ | 15/250.36 |
| 3,084,372 | 4/1963 | Krohm............................. | 15/250.36 |
| 3,097,389 | 7/1963 | Contant et al............ | 16/250.36 UX |

*Primary Examiner*—Peter Feldman
*Attorney, Agent, or Firm*—Alan H. Levine

[57] ABSTRACT

A rubber windshield wiper blade is clamped to rocker arms at several points along its length. The sides of the blade are formed with cavities at locations corresponding to the locations of the clamps so as to permit flexure of the blade without hindrance from the clamps.

2 Claims, 4 Drawing Figures

RUBBER WINDSHIELD WIPER BLADES HAVING INCREASED FLEXIBILITY AT CLAMPING POINTS

It is known that in a windshield wiper, the rubber wiper blade, reinforced by a pair of elastic and flexible laminae, engages a back reinforcement through the terminals of rocker arms which are in turn articulated with respect to the end of a central rod.

The engagement between the end of each rocker arm and the wiper blade is generally provided by the tightening of suitable side edges of the blade, by means of the rocker arm ends which are substantially C-shaped and form terminal clamps.

It is known that during the operation of the windshield wiper, each wiper blade is subjected to a continuous transverse bending stress, which alternates in direction, and is caused by the back-and-forth movement of the corresponding oscillating arm and by the friction which develops between the blade and the glass surface. The bending stress determines the flexure of the blade which, due to the triangular outline of its cross section, leans alternatively with its sides against one or the other of its upper longitudinal edges. The blade is retained by the metallic laminae and in the tightened clamps of the rocker arm ends, and therefore its flexure is hampered.

In effect, where the wiper blade meets the protruding ends of the rocking arms, it abuts against them so that there is a discontinuity along its line of flexure which, in a short time is reflected along the line of tangency of the blade with respect to the glass surface; this adversely affects the wiping capability of the wiper blade.

In order to overcome this serious drawback, the improvement according to the invention is characterized generally in that the longitudinal ribs or edges of the wiper blade present small cavities at locations corresponding to the engaging clamps of the rocking arm ends, in order to receive the lateral projection of each clamp, thereby allowing the wiper blade to flex uniformly along its whole length without zones of interruption.

Additional particular features of the improvement will be seen from the following specification with reference to the drawing, annexed only for illustrating an example of the invention, and wherein.

Figure 1:
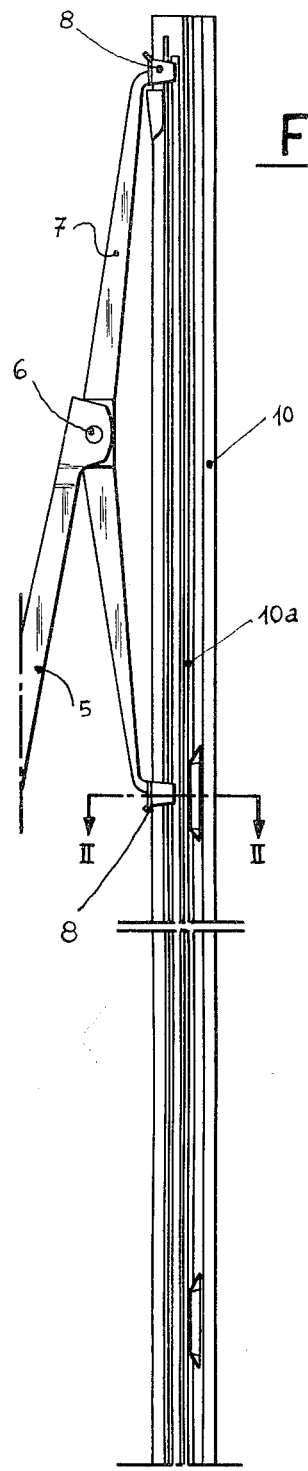
FIG. 1 is a partial longitudinal elevational view of a wiper blade according to the subject matter of the invention.

With reference to the drawing, 5 indicates the central rod of the wiper blade reinforcement articulated at 6 to the rocker arm 7. Each end 8 of rocker arm 7 is shaped to define a clamp having a substantially "C" shaped cross-section, which grips the back 9 of the wiper blade 10 together with the pair of elastic and flexible laminae 11.

According to the invention, at locations corresponding to each clamp 8, the part of each wiper blade having a triangular cross section 10a is formed with cavities 12 in order to remove in those parts a portion of the longitudinal edge of the wiper blade.

Figure 2:
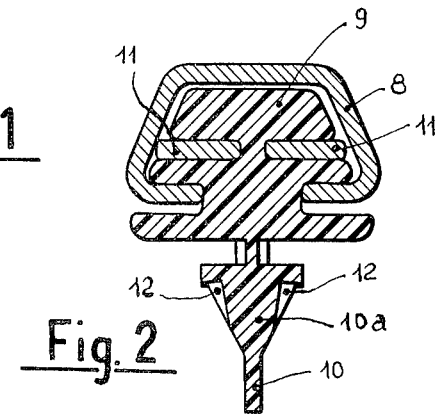
FIG. 2 is a cross section of the blade, on a larger scale, taken along line II—II of FIG. 1.
Figure 3:
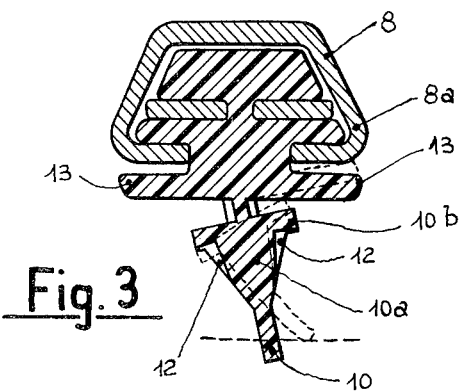
FIG. 3 is similar to FIG. 2 and illustrates an operating position of the wiper blade.
Figure 4:
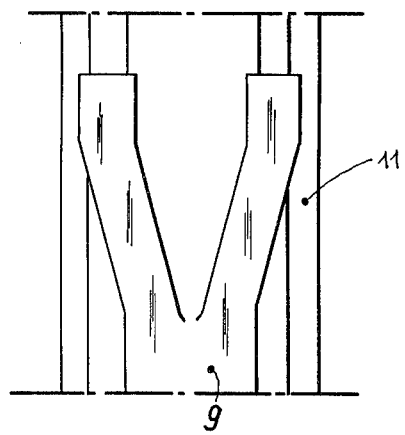
FIG. 4 is a top plan view of an end of the rubber wiper blade.

As previously stated, when each wiper blade is actuated with an angular movement, during its movements on the glass surface and during each of its strokes, the wiper blade 10 moves from the position represented in FIG. 2, initially to the flexed position represented by solid lines in FIG. 3, and immediately after to the position represented by dotted lines. When it reaches the latter position, the side 10b of the wiper blade, which inclines together with the longitudinal edge 13, meets the stop formed by the elbow 8a of the clamp 8. Therefore, at the locations of each clamp (generally there are four clamps for each wiper blade corresponding to the ends of two rocking arms 7) the complete flexure of the wiper blade is, with conventional blades, physically prevented while for the remainder of the length of the wiper blade, that is, for the length located between the successive clamps 8, there are no physical obstacles and therefore the limitation of the transverse flexure is determined only by the elastic resistance of the wiper blade. As a result of what has been described above, the parts of wiper blade 10 in locations corresponding to clamps 8, and in the absence of cavities 12, slide with a greater friction on the glass surface and generate arcuate traces which rapidly deteriorate the rubber part of the wiper blade and, in any case, leave the glass uncleaned with a consequent lower visibility through the uncleaned part of the glass.

The presence of the cavities 12, symmetrical and exposed, formed in the sides of the wiper blade, reduce the bending resistance of the same exactly in locations corresponding to the locations of the elbows 8a of each clamp 8, allowing the uniform flexure of the wiper blade 10, 10a along its whole length and eliminating the drawback described above.

It is obvious that the cavities 12 may have an outline and a depth different from the ones shown as an illustrative example, while maintaining the concept of reducing the bending resistance of blade 10 in the transverse direction, in locations corresponding to the connections of the rocker arm ends.

What is claimed is:

1. A resilient blade for use in a windshield wiper assembly, said assembly including a rocker arm carrying spaced apart clamps for gripping the blade at longitudinally spaced points on the blade, said blade comprising:
   a. a back portion adapted to be accommodated within the clamps,
   b. an edge portion adapted to contact a windshield,
   c. a narrow intermediate portion between said back and edge portions defining a hinge along which said edge portion can pivot with respect to said back portion,
   d. a portion of generally triangular cross-sectional shape between said edge portion and said intermediate portion which thickens from said edge portion toward said intermediate portion, and
   e. cavities in said triangular portion only at points laterally aligned with the points at which the clamps grip said back portion, said triangular portion being of full thickness in the longitudinal regions between said cavities.

2. A resilient blade as defined in claim 1 wherein said cavities are located on both longitudinal sides of said triangular portion.

* * * * *